United States Patent
Srivastava et al.

(10) Patent No.: US 12,278,786 B2
(45) Date of Patent: Apr. 15, 2025

(54) SYSTEMS AND METHODS TO SIGNAL A CHANGING QUANTITY OF LAYERS IN A MULTI-SUBSCRIBER IDENTITY MODULE DEVICE

(71) Applicant: QUALCOMM Incorporated, San Diego, CA (US)

(72) Inventors: Akash Srivastava, Hyderabad (IN); Tanay Kabra, Hyderabad (IN); Priyangshu Ghosh, Hyderabad (IN); Karthikeyan Sabapathi, Hyderabad (IN); Pankaj Bansal, Hyderabad (IN); Manasa Yarramasu, Guntur (IN); Mahender Reddy Akkapally, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 17/805,766

(22) Filed: Jun. 7, 2022

(65) Prior Publication Data
US 2023/0396397 A1 Dec. 7, 2023

(51) Int. Cl.
| | |
|---|---|
| *H04L 5/00* | (2006.01) |
| *H04W 8/18* | (2009.01) |
| *H04W 68/00* | (2009.01) |
| *H04B 7/0413* | (2017.01) |
| *H04W 88/06* | (2009.01) |

(52) U.S. Cl.
CPC .......... *H04L 5/0092* (2013.01); *H04L 5/0051* (2013.01); *H04W 8/183* (2013.01); *H04W 68/005* (2013.01); *H04B 7/0413* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2017/0367125 A1* | 12/2017 | Krishnamoorthy | ... | H04W 76/38 |
| 2018/0160422 A1* | 6/2018 | Pathak | ................... | H04W 76/10 |
| 2019/0053130 A1* | 2/2019 | Guo | ....................... | H04L 1/0026 |
| 2021/0006963 A1* | 1/2021 | Chauhan | ............... | H04L 1/0026 |
| 2023/0088631 A1* | 3/2023 | Kumar | ...................... | H04L 5/14 370/280 |
| 2023/0276266 A1* | 8/2023 | Yang | ..................... | H04W 24/02 370/252 |

* cited by examiner

*Primary Examiner* — Xavier S Wong
(74) *Attorney, Agent, or Firm* — Haynes and Boone, LLP

(57) ABSTRACT

A user equipment (UE) includes: a first subscriber identity module (SIM) associated with a first service provider subscription and a second SIM associated with a second service provider subscription; the US is configured to operate the first service provider subscription in an active-mode and operating the second service provider subscription in an idle mode; and the UE is further configured to signal a changing quantity of multiple input, multiple output (MIMO) layers available to the first service provider subscription in response to radio frequency (RF) resource sharing with the second service provider subscription for a paging operation of the second service provider subscription.

16 Claims, 9 Drawing Sheets

SYSTEMS AND METHODS TO SIGNAL A CHANGING QUANTITY OF LAYERS IN A MULTI-SUBSCRIBER IDENTITY MODULE DEVICE

TECHNICAL FIELD

This application relates to wireless communication systems, and more particularly signaling a changing number of layers in multi-subscriber identity module (Multi-SIM) devices.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change. Some UE manufacturers are responding to consumer preferences by including multiple subscriber identity modules (SIMs) within UEs.

However, including multiple SIMs within a device may lead to scenarios in which activities associated with one SIM may interfere with or preclude activities associated with the other SIM. There is a need in the art for techniques to manage use of multiple service provider subscriptions in multi-SIM devices.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is performed by a user equipment (UE). The method of wireless communication also includes operating in a mode in which a first subscription associated with a first subscriber identity module (SIM) and a second subscription associated with a second SIM share radio frequency (RF) resources of the UE; transmitting a first sounding reference signal (SRS) from the UE, where the first SRS indicates a first quantity of layers available to the first subscription; receiving a first uplink (UL) grant from a network for the first quantity of layers for the first subscription; transmitting a second SRS, where the second SRS indicates a second quantity of layers available to the first subscription, the second quantity of layers being less than the first quantity of layers; receiving a second UL grant from the network for the second quantity of layers; tuning away a first transmit chain associated with a first one of the layers; receiving paging messages by the second subscription during a duration of the tuning away; and subsequent to the duration of the tuning away, transmitting a third SRS by the first subscription, where the third SRS indicates the first quantity of layers available to the first subscription.

In an additional aspect of the disclosure, a user equipment (UE) includes a first subscriber identity module (SIM) associated with a first service provider subscription and a second SIM associated with a second service provider subscription; and a processor configured to access the first SIM and the second SIM, where the processor is further configured to: operate in a mode in which the first service provider subscription is in an active mode and the second service provider subscription is in an idle mode; determine a periodicity associated with a paging cycle of the second service provider subscription; transmit first information indicating a quantity of layers less than a maximum quantity of layers available to the first service provider subscription according to the periodicity associated with the paging cycle and in a first pattern of SRS occasions preceding tune away events of the paging cycle of the second service provider subscription; and transmit second information indicating the maximum quantity of layers available to the first service provider subscription according to the periodicity associated with the paging cycle and in a second pattern of SRS occasions subsequent to tune away events of the paging cycle of the second service provider subscription.

In an additional aspect of the disclosure, a non-transitory computer-readable medium having program code recorded thereon for wireless communication by a user equipment (UE) is disclosed. The non-transitory computer-readable medium also includes code for operating in a mode in which a first subscription associated with a first subscriber identity module (SIM) and a second subscription associated with a second SIM share radio frequency (RF) resources of the UE; code for transmitting an indication of a first quantity of layers available to the first subscription during a first sounding reference signal (SRS) occasion; code for receiving a first uplink (UL) grant from a network for the first quantity of layers for the first subscription; code for transmitting an indication of a second quantity of layers available to the first subscription during a second SRS occasion, the second quantity of layers being less than the first quantity of layers; code for receiving a second UL grant from the network for the second quantity of layers; code for tuning away a first transmit chain associated with a first one of the layers; code for receiving paging messages by the second subscription during a duration of the tuning away; and code for transmitting an indication of the first quantity of layers during a third SRS occasion subsequent to the duration of the tuning away.

In an additional aspect of the disclosure, a user equipment (UE) includes a first subscriber identity module (SIM) associated with a first service provider subscription and a second SIM associated with a second service provider subscription; means for operating the first service provider subscription in an active-mode and operating the second service provider subscription in an idle mode; and means for signaling a changing quantity of multiple input, multiple output (MIMO) layers available to the first service provider subscription in response to radio frequency (RF) resource sharing with the second service provider subscription for a paging operation of the second service provider subscription.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
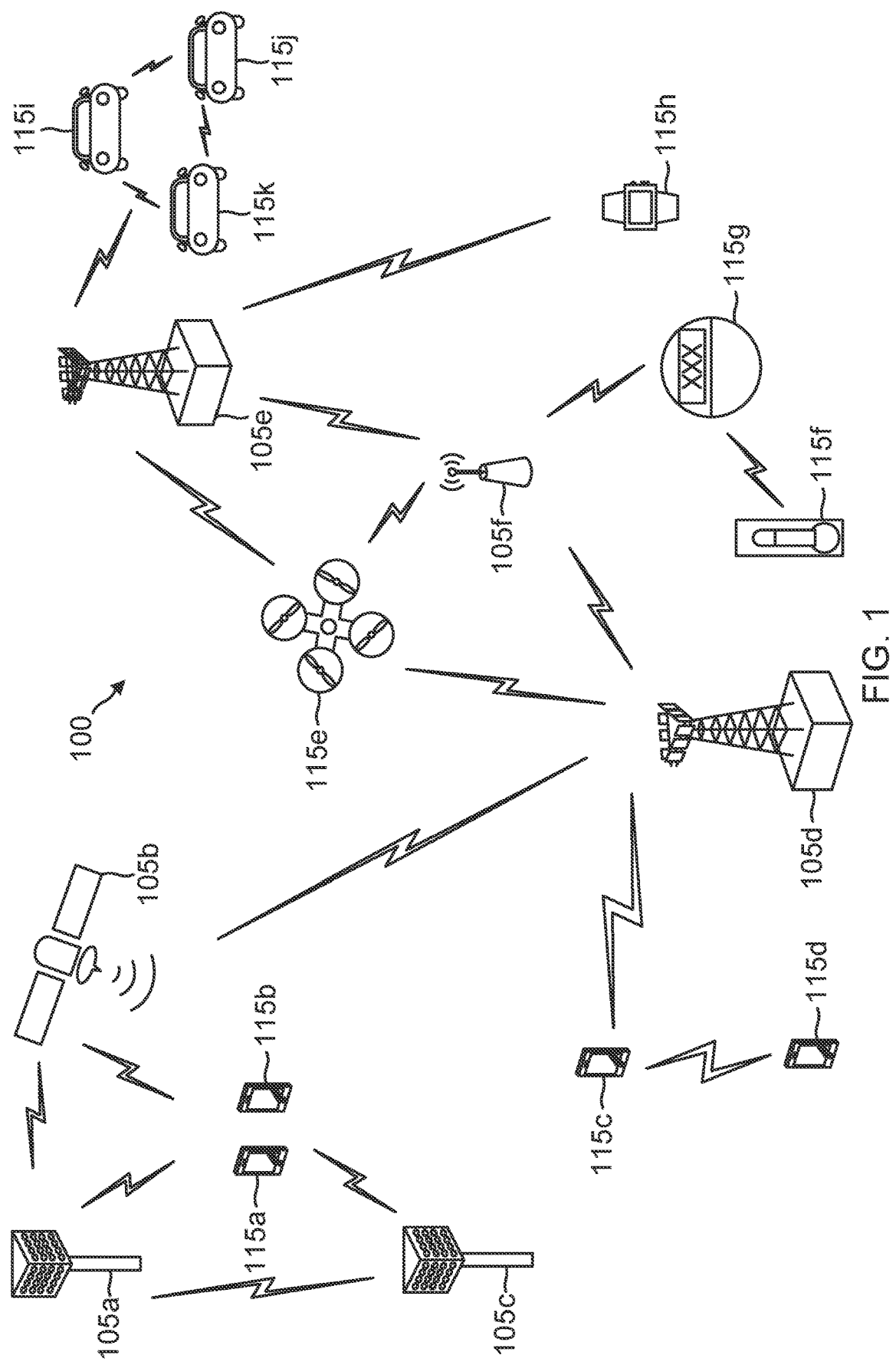
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a wireless communication device or UE is a multiple SIM (Multi-SIM) device capable of utilizing multiple subscriptions for communication with one or more networks. For instance, the UE may include two SIMs, a first SIM for a first subscription and a second SIM for a second subscription. In some instances, the first and second subscriptions may be provided by the same service provider. For example, the first subscription and the second subscription may correspond to different user accounts and/or services on the same service provider network. In other instances, the first and second subscriptions may be provided by different service providers. In any case, in certain scenarios, the UE may communicate using the first subscription and/or the second subscription. In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one subscription may be active at a given time. The DSDS mode may be suitable for UEs that are equipped with a single transceiver and/or radio frequency (RF) chain which can either be utilized by the first subscription or the second subscription. In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

For a multi-SIM device, one of the SIMs/subscriptions carries the internet data traffic, and it is referred to as the default data subscription (DDS) The other subscription—nDDS—is mainly used for voice and short message service (SMS). The user chooses which subscription is the DDS, and the user may change the DDS through a user interface (UI) of the UE.

Some UEs provide multiple antenna elements, which may be used for techniques such as transmit diversity, receive diversity, multiple-input multiple-output (MIMO) communications, or beamforming. For example, wireless communications system may use a transmission scheme between a first device (e.g., a base station) and a second device (e.g., a UE), where the first device is equipped with multiple antenna elements and the second device is equipped with one or more antenna elements. MIMO communications may employ multipath signal propagation to increase the spectral efficiency by transmitting or receiving multiple signals via different spatial layers, which may be referred to as spatial multiplexing. The multiple signals may, for example, be transmitted by the UE via different antenna elements or different combinations of antenna elements. Likewise, the multiple signals may be received by the base station via different antenna elements or different combinations of antenna elements. Similarly, the base station may perform transmitting with multiple antennas, and the UE may perform receiving with multiple antennas.

Each of the multiple signals may be referred to as a separate spatial stream and may carry bits associated with the same data stream or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

For a multi-SIM device in DSDS mode, there may be periodic sharing of the UE's radio frequency (RF) resources between the two subscriptions for signal transmission on one subscription and decoding pages and performing measurements in idle mode on the other subscription. Such periodic sharing may result in undesirable loss of uplink (UL) throughput in some instances, as described below.

Sounding reference signal (SRS) periodicity can vary from 10 ms to 160 ms as configured by the network in some examples. If the periodicity of SRS is 80 ms, until the time another SRS occasion falls, the network may not be able to assess the condition of the UE transmit and receive ports for another 80 ms. Furthermore, the UE may use SRS occasions to transmit codebook entries that correspond to a number of MIMO layers supported by the UE. For instance, if the UE is able to support two MIMO layers, then it may transmit codebook entries to the base station to indicate that it may support two MIMO layers. The base station may then provide an appropriate modulation and coding scheme (MCS) and quantity of resource blocks (RBs) to take advantage of the two MIMO layers. On the other hand, if the UE may only support a single MIMO layer, then it may transmit a codebook entry to the base station to indicate that it only supports the single MIMO layer, and the base station may then grant UL resources according to an appropriate MCS and quantity of RBs. Of course, one MIMO layer and two MIMO layers are for example only, and the scope of implementations applies to any number of MIMO layers, such as four MIMO layers or more.

In one example of multi-SIM operation, a first subscription may be active and using two MIMO layers, and the other subscription may be in idle mode. However, the UE may have a hardware architecture such that some radio frequency (RF) resources are shared when certain bands are used. For instance, when the idle mode subscription receives a paging signal on a particular frequency resource, it may be programmed to cause the active mode subscription to suspend use of the RF hardware resources while the idle mode subscription uses those RF hardware resources to decode and measure the paging signal. Once the paging operation is over, the idle mode subscription may then hand back use of the RF hardware resources to the active mode subscription. The period of time associated with the idle mode subscription using the RF hardware resources may be referred to as a "tune away" or a "tuning away duration" because it may include the idle mode subscription tuning the RF hardware resources away from a frequency resource used by the active mode subscription to the particular frequency resource used by the idle mode subscription for paging operations.

As noted above, due to sharing of the RF resources to the other subscription, transmission from a first subscription (e.g., the DDS) may be suspended while the RF resources tune away for page decode and measurement for the other subscription (e.g., the nDDS). The tune away may cause the UE to not be able to utilize some of its grants for UL transmission provided by the network. The network may interpret the lack of use of some of the grants as block error rate (BLER) and then penalize the UE by assigning an MCS and quantity of RBs that reduces the throughput of the UE.

In fact, some network operators are aggressive in penalizing the UE due to BLER. Simulation and field testing has shown that in one instance, the DDS may be served with lesser MCS and RBs, resulting in DL throughput degradation of about ~20% with a paging cycle of 320 ms when compared to a single SIM device.

In some implementations, a UE may detect that at least one transmit (TX) layer associated with a first subscription is either sharing or would share RF resources with a periodic activity (e.g., paging operations) of the other subscription. The UE may then send a codebook entry based on the number of TX layers remaining during the tune away duration. For instance, if the first subscription uses two MIMO layers for UL, and one of the MIMO layers would be interrupted by a tune away to accommodate the other subscription, then the UE may then send a codebook entry based on the remaining number of MIMO layers (in this example, one). Since a tune away may be periodic and in some instances less frequent than SRS occasions, the UE may then transmit codebook entries indicating fewer MIMO layers preceding expected tune away durations but also transmit codebook entries indicating a greater quantity of MIMO layers for other ones of the SRS occasions.

Continuing with the example, the network may receive a codebook entry indicating a fewer number of MIMO layers and grant UL resources for the available MIMO layers only. Once the tune away duration has passed, the UE transmits a codebook entry indicating its full number of MIMO layers for UL, and the network grants an appropriate number of UL resources for the full number of UL MIMO layers. The network does not expect the UE to use UL resources for the full number of MIMO layers during the tune away durations and, as a result, the network does not interpret BLER for the tune away and does not penalize the UE.

Furthermore, since the tune away durations are expected to be periodic, the UE may set multiple different patterns for SRS occasions. In a first pattern of SRS occasions that are associated with tune away durations, the UE may transmit appropriate codebook entries associated with a fewer number of UL MIMO layers. In a second pattern of SRS occasions that are not associated with tune away durations, the UE may transmit appropriate codebook entries associated with the full number of UL MIMO layers.

Various implementations may include advantages. For instance, implementations providing for changing codebook entries to accommodate tune away durations may experience greater UL throughput to the DDS compared to a multi-SIM device that is unable to change codebook entries to accommodate tune away durations. The greater UL throughput may lead to more efficient operation of the DDS as well as greater user satisfaction.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e, which may be airborne. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI- RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UE 115 may be capable of utilizing multiple SIMs and may transmit codebooks indicating changing numbers of UL MIMO layers for a first subscription to accommodate periodic receive operations by a second subscription, as explained in more detail below.

Figure 2:
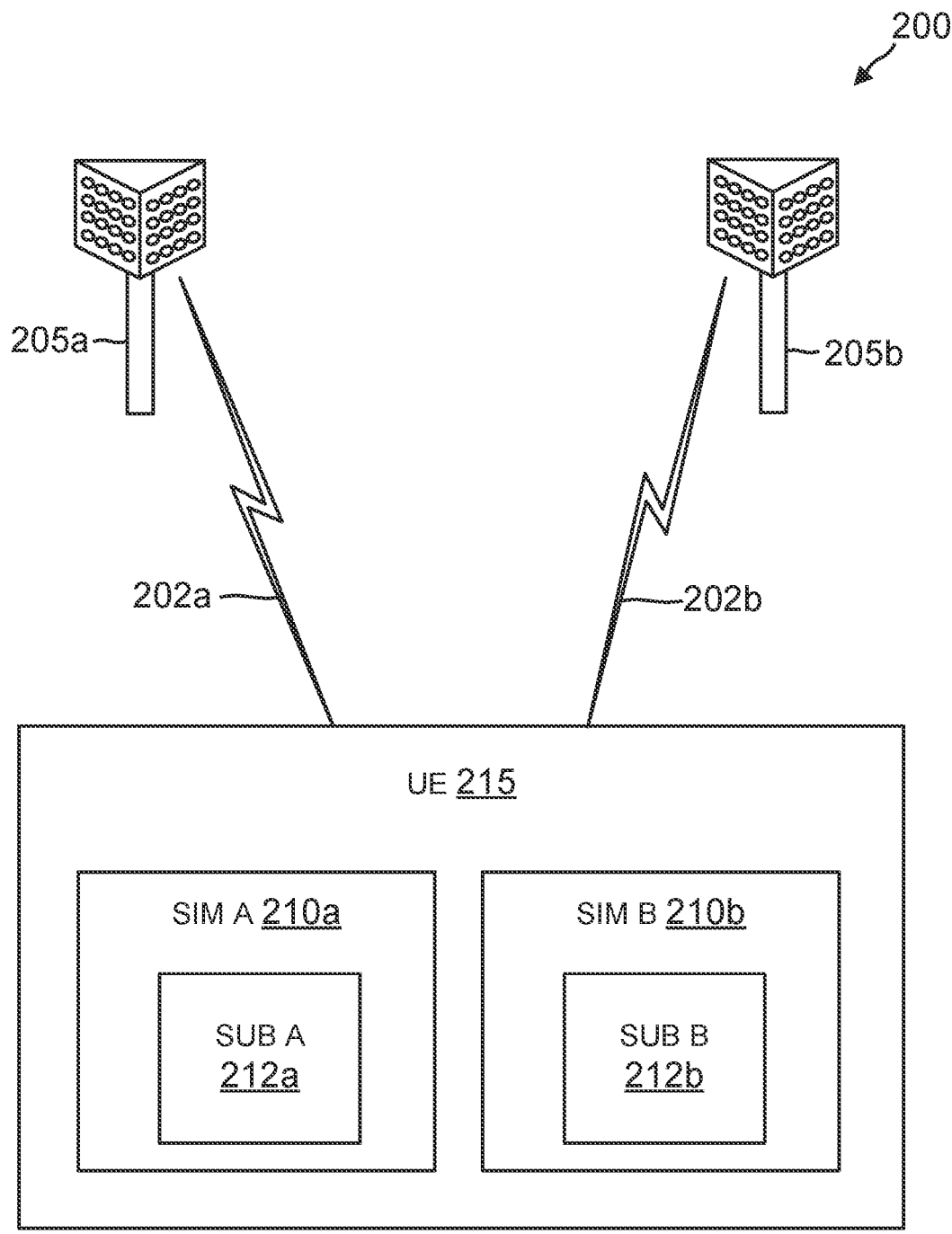
FIG. 2 illustrates a communication scenario utilizing multiple subscriptions according to some aspects of the present disclosure.

FIG. 2 illustrates a communication scenario 200 that utilizes multiple subscriptions according to some aspects of the present disclosure. The communication scenario 200 may correspond to a communication scenario among BSs 105 and or UEs 115 in the network 100. For simplicity, FIG. 2 illustrates two BSs 205 (shown as 205*a* and 205*b*) and one UE 215, but a greater number of UEs 215 (e.g., the about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115, respectively.

In the scenario 200, the UE 215 is capable of utilizing multiple SIMs (e.g., SIM cards) for communication with one or more networks. For simplicity, FIG. 2 illustrates the UE 215 including two SIMs 210 (shown as SIM A 210*a* and SIM B 210*b*), but the UE 215 may include more than two SIMs (e.g., about 3, 4 or more). In some aspects, each SIM 210 may include integrated circuits and/or memory configured to store information used for accessing a network, for example, to authenticate and identify the UE 215 as a subscriber of the network. Some examples of information stored at the SIM A 210*a* and/or SIM B 210*b* may include, but not limited to, a subscriber identity such as an international mobile subscriber identity (IMSI) and/or information and/or key used to identify and authenticate the UE 215 in a certain provider network. As an example, the UE 215 may subscribe to a first operator and a second operator. That is, the UE 215 may have a first subscription 212*a* (shown as SUB A) with the first operator and a second subscription 212*b* (shown as SUB B) with the second operator. Accordingly, the SIM A 210*a* may store or maintain information for accessing a network of the first operator based on the first subscription 212*a*, and the SIM B 210*b* may store information for accessing a network of the second operator based on the second subscription 212*b*. In some instances, the first operator and the second operator may correspond to the same operator. For example, the first subscription 212*a* and the second subscription 212*b* may correspond to different user accounts and/or services subscribed with the same operator. In other instances, the first operator may be different from the second operator.

In operation, the UE 215 may communicate with a BS 205*a* (operated by the first operator) using the SIM A 210*a* via a radio link 202*a*. Further, the UE 215 may communicate with a BS 205*b* (operated by the second operator) using the SIM B 210*b* via a radio link 202*b*. In some aspects, the UE 215 may use the same radio access technology (e.g., NR or NR-U) for communication with the BS 205*a* and the BS 205*b*. In other aspects, the UE 215 may use one radio access technology (e.g., NR or NR-U) for communication with the BS 205*a* and another radio access technology (e.g., LTE) for communication with the BS 205*b*. Although FIG. 2 illustrates the UE 215 communicates with different BSs 205 using the SIM A 210*a* and the SIM B 210*b*, it should be understood that in other examples the UE 215 may communicate with the same BS. For instance, the UE 215 may communicate with the same BS 205*a* for the first subscription 212*a* via the SIM A 210*a* and for the second subscription 212*b* via the SIM B 210*b*.

In some aspects, the UE 215 may operate in a DSDS mode, where both SIMs 210*a* and 210*b* can be on standby (in an idle mode) waiting to begin communications. When a communication is established for one SIM (e.g., the SIM A 210*a*), the other SIM (e.g., the SIM B 210*b*) is no longer active. That is, one subscription 212*a* or *b* may be active at a given time. In another example, the UE 215 may operate in a DSDA mode, where both subscriptions 212*a* and *b* may be active at a given time.

Continuing with the example, the UE 215 may provide for multi-layer MIMO operation. In one example, N layers corresponds to N data streams in separate beams using a same time resource and same or different frequency resources for each of the beams, wherein N is an integer larger than one. For instance, the DDS subscription may employ UL transmissions on multiple layers, while the other subscription is in idle mode and periodically performs paging operations. In one example, subscription 212*a* may employ UL transmissions on multiple (N) layers, where radio link 202*a* represents multiple beams, and subscription 212*b* may be in idle mode (or vice versa).

Furthermore, UE 215 may transmit codebook entries for varying quantities of layers for a first subscription while accommodating paging operations on the other subscription, according to the techniques described below with respect to FIGS. 5-7.

Figure 3:
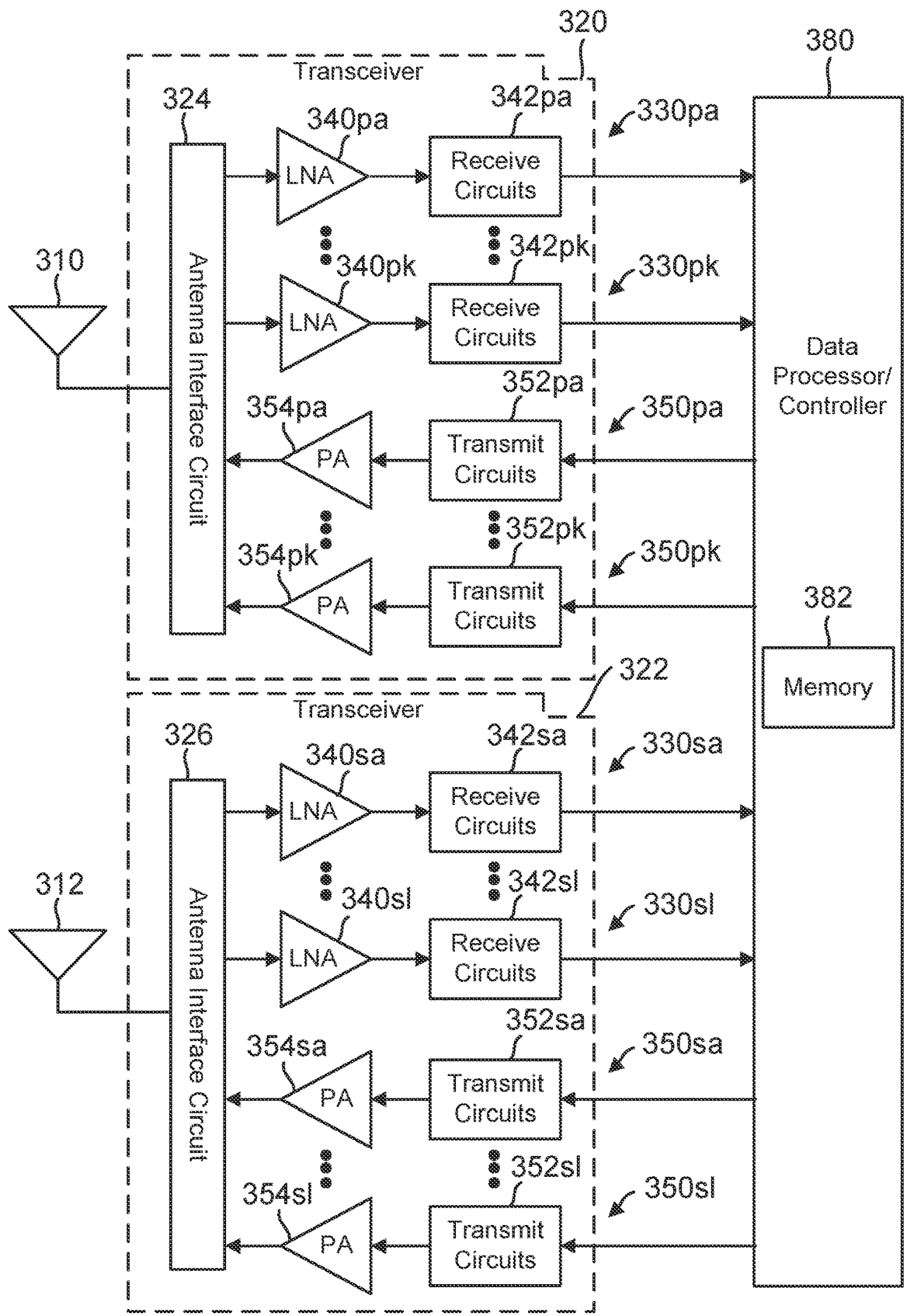
FIG. 3 is a block diagram of a hardware architecture of a UE, such as the UEs of FIGS. 1-2, according to some aspects of the present disclosure.
Figure 8:
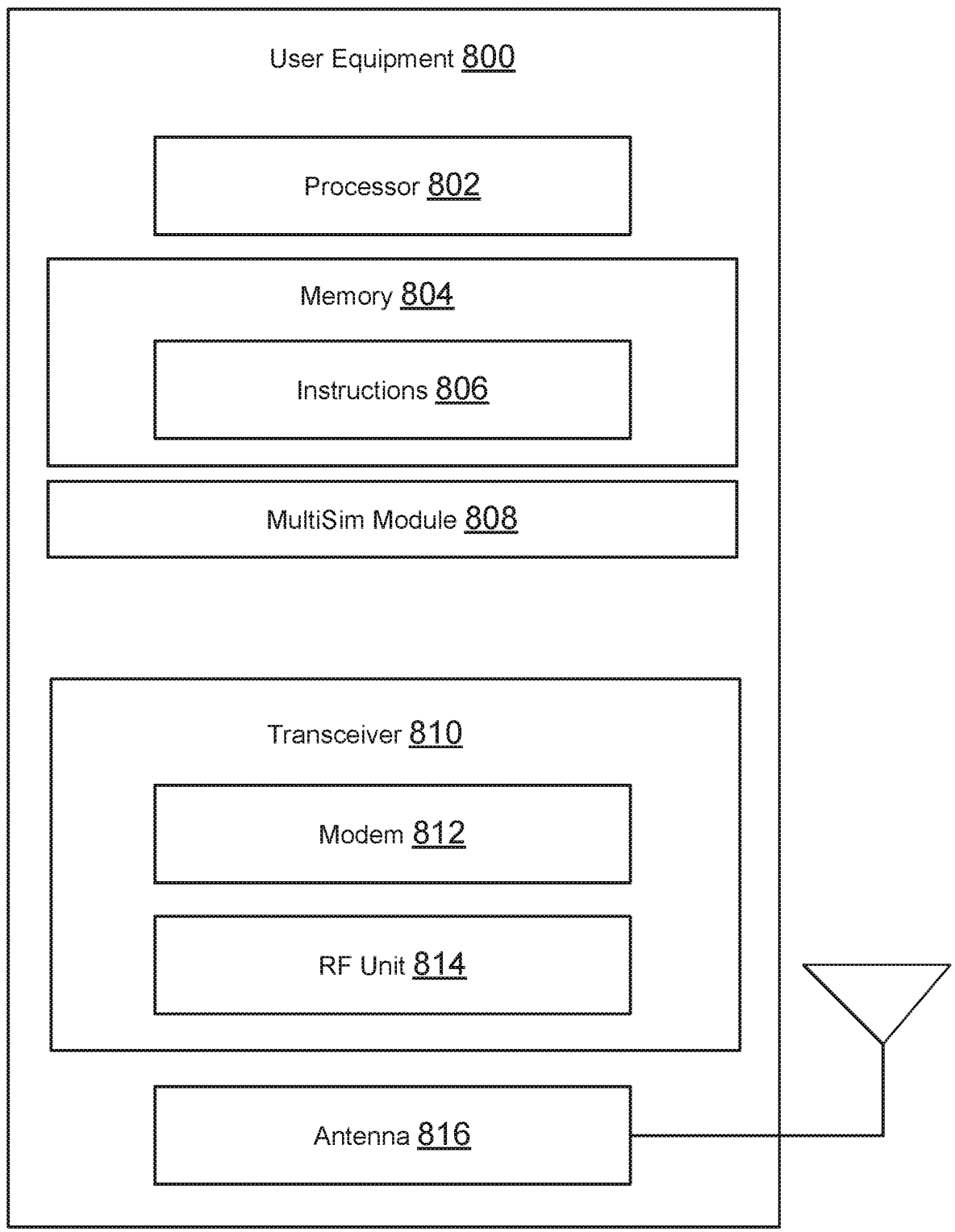
FIG. 8 illustrates a block diagram of a user equipment (UE) according to some aspects of the present disclosure.

FIG. 3 illustrates an example hardware architecture for RF chains, which may be implemented within UE 115 (FIG. 1), UE 215 (FIG. 2), or UE 800 (FIG. 8). In this exemplary design, the hardware architecture includes a transceiver 320 coupled to a first antenna 310, a transceiver 322 coupled to a second antenna 312, and a data processor/controller 380. Transceiver 320 includes multiple (K) receivers 330*pa* to 330*pk* and multiple (K) transmitters 350*pa* to 350*pk* to support multiple frequency bands, multiple radio technologies, carrier aggregation, etc. Transceiver 322 includes L receivers 330*sa* to 330*s*1 and L transmitters 350*sa* to 350*s*1 to support multiple frequency bands, multiple radio technologies, carrier aggregation, receive diversity, MIMO transmission from multiple transmit antennas to multiple receive antennas, etc.

In the exemplary design shown in FIG. 3, each receiver 330 includes an LNA 340 and receive circuits 342. For data reception, antenna 310 receives signals from base stations and/or other transmitter stations and provides a received RF signal, which may be routed through an antenna interface circuit 324 and presented as an input RF signal to a selected receiver. Antenna interface circuit 324 may include switches, duplexers, transmit filters, receive filters, matching circuits, etc. The description below assumes that receiver 330*pa* is the selected receiver, though the described operations apply equally well to any of the other receivers 330. Within receiver 330*pa*, an LNA 340*pa* amplifies the input RF signal and provides an output RF signal. Receive circuits 342*pa* downconvert the output RF signal from RF to baseband, amplify and filter the downconverted signal, and provide an analog input signal to data processor 380. Receive circuits 342*pa* may include mixers, filters, amplifiers, matching circuits, an oscillator, a local oscillator (LO) generator, a phase locked loop (PLL), etc. Each remaining receiver 330 in transceivers 320 and 322 may operate in a similar manner as receiver 330*pa*.

In the exemplary design shown in FIG. 3, each transmitter 350 includes transmit circuits 352 and a power amplifier (PA) 354. For data transmission, data processor 380 processes (e.g., encodes and modulates) data to be transmitted and provides an analog output signal to a selected transmitter. The description below assumes that transmitter 350*pa* is the selected transmitter, though the described operations apply equally well to any of the other transmitters 350. Within transmitter 350*pa*, transmit circuits 352*pa* amplify, filter, and upconvert the analog output signal from baseband to RF and provide a modulated RF signal. Transmit circuits 352*pa* may include amplifiers, filters, mixers, matching circuits, an oscillator, an LO generator, a PLL, etc. A PA 354*pa* receives and amplifies the modulated RF signal and provides a transmit RF signal having the proper output power level. The transmit RF signal may be routed through antenna interface circuit 324 and transmitted via antenna 310. Each remaining transmitter 350 in transceivers 320 and 322 may operate in a similar manner as transmitter 350*pa*.

FIG. 3 shows an exemplary design of receiver 330 and transmitter 350. A receiver and a transmitter may also include other circuits not shown in FIG. 3, such as filters, matching circuits, etc. All or a portion of transceivers 320 and 322 may be implemented on one or more analog (ICs, RF ICs (RFICs), mixed-signal ICs, etc. For example, LNAs 340 and receive circuits 342 within transceivers 320 and 322 may be implemented on multiple IC chips or on the same IC chip. The circuits in transceivers 320 and 322 may also be implemented in other manners.

Data processor/controller 380 may perform various functions for wireless device 110. For example, data processor 380 may perform processing for data being received via receivers 330 and data being transmitted via transmitters 350. Controller 380 may control the operation of the various circuits within transceivers 320 and 322. A memory 382 may store program codes and data for data processor/controller 380. Data processor/controller 380 may be implemented on one or more application specific integrated circuits (ASICs) and/or other ICs.

Controller 380 may be in communication with transceivers 320, 322 to provide DSDA operation in which one subscription may be transmitting and receiving data, while the other subscription may be in idle mode. The controller 380 may execute software logic that assigns one of the transceivers 320, 322 to a particular subscription and the other one of the transceivers to the other subscription in a dual SIM implementation. In another example, the controller 380 may assign both transceivers 320, 322 to both subscriptions, thereby allowing both subscriptions to employ multi-antenna operations, such as MIMO operation and beam forming.

In one example implementation, one of the subscriptions is active, whereas the other subscription is in idle mode. During an SRS occurrence, the first subscription (e.g., the DDS) may use the transmitting portions of either or both of the transceivers 320, 322 to transmit an SRS that includes a codebook entry indicating a quantity of layers for UL MIMO. The network may receive the codebook entry and provide a corresponding grant of UL resources.

However, the other subscription may periodically receive paging signals from its network. In doing so, the other subscription may use RF resources (e.g., antennas 310, 312, interface circuits 324, 326, and various filters, mixers, oscillators, and processing circuits not shown) and require those RF resources to be tuned away from UL resources associated with at least one of the layers and tuned instead toward the paging signals. That tune away time represents a duration in which UL transmission on at least one of the layers may be suspended. Therefore, in various implementations, the processor 380 executes instructions to provide appropriate codebook entries that take into account available layers during a tune away duration, as described in more detail below with respect to FIGS. 4-7.

Figure 4:
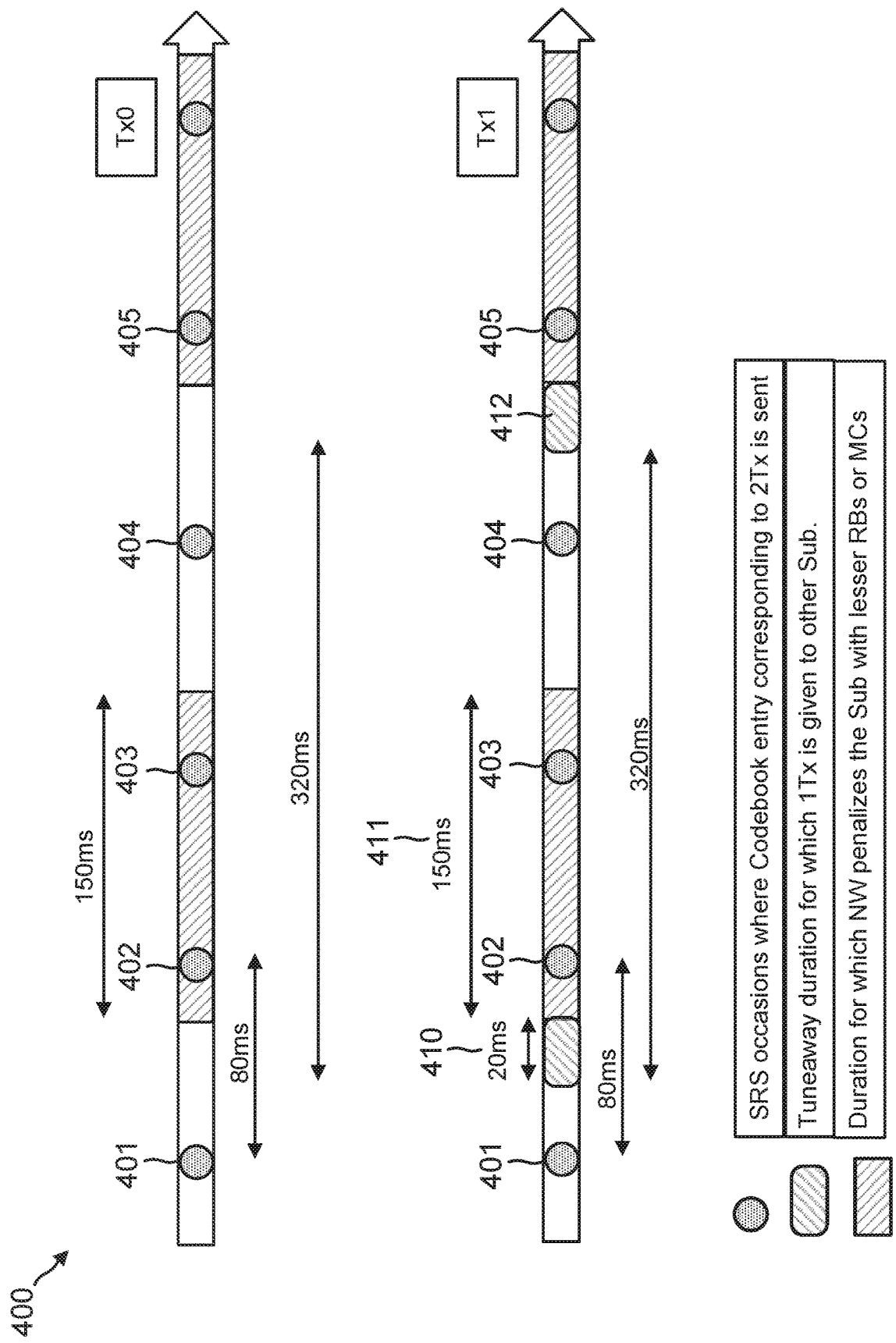
FIGS. 4-5 are example timelines for transmitting in a multi-SIM device, according to some aspects of the disclosure.

FIG. 4 is an illustration of an example timeline 400, according to one implementation. The timeline 400 may represent the operation of a UE, such as UE 115 (FIG. 1), UE 215 (FIG. 2), or UE 800 (FIG. 8).

Timeline 400 includes a multitude of SRS occasions, exemplified by the dots 401-405, and they are the same for both UL MIMO layers Tx0, Tx1. UL MIMO layers Tx0, Tx1 represent two different data streams in separate beams using a same time resource and a same or different frequency resource in each of the beams. Furthermore, the UL MIMO layers Tx0, Tx1 illustrates transmissions by an active-mode subscription associated with the UE.

Each of the SRS occasions 401-405 include transmitting a codebook entry indicating a quantity of layers equal to two. In this example, there is an 80 ms periodicity of the SRS occasions 401-405, a 320 ms periodicity of the tune away durations 410, 412, and a 150 ms penalization duration 411, though the scope of embodiments is not limited to any particular time duration or periodicity for any of these characteristics. For instance, the periodicity of the SRS occasions 401-405 may be anywhere from 10 ms to 160 ms in some networks, and length of tune away durations and penalization durations may be dependent upon RF hardware resources and network preferences, respectively. The tune away duration is not something configured by the network or the UE; instead, the tune away duration is usually a function of the software or hardware of the UE, and it is not readily changeable.

Before and immediately after the SRS occasion 401, the network has granted UL resources corresponding to a full use of the two layers. However, between the SRS occasions 401 and 402, tune away duration 410 occurs. Tune away duration 410 includes a time in which an idle mode subscription in the multi-SIM device has control of RF hardware in order to perform the page decode and other measurements. Such RF hardware is unavailable to the active-mode subscription during tune away period 410. Tune away duration 410 is shown as extending from a time when the tune away starts to a time when the tune away ends. During tune away duration 410, the active mode subscription transmits using less UL resources that have been granted, which the network may interpret as BLER. Accordingly, the network reduces UL throughput of the UE during the penalization duration 411. After the penalization duration 411 ends, the network once again grants UL resources corresponding to full use of the two layers, and this is shown between SRS occasions 403 and 404.

Once again, a tune away duration, this time tune away duration 412, causes the UE to be penalized starting before SRS occasion 405 and extending for 150 ms again. FIG. 4 illustrates the loss of throughput that may occur as a result of the SRS occasions 401-405 consistently being used to indicate two UL MIMO layers even when some UL resources may be unused during tune away durations 410, 412.

Figure 5:
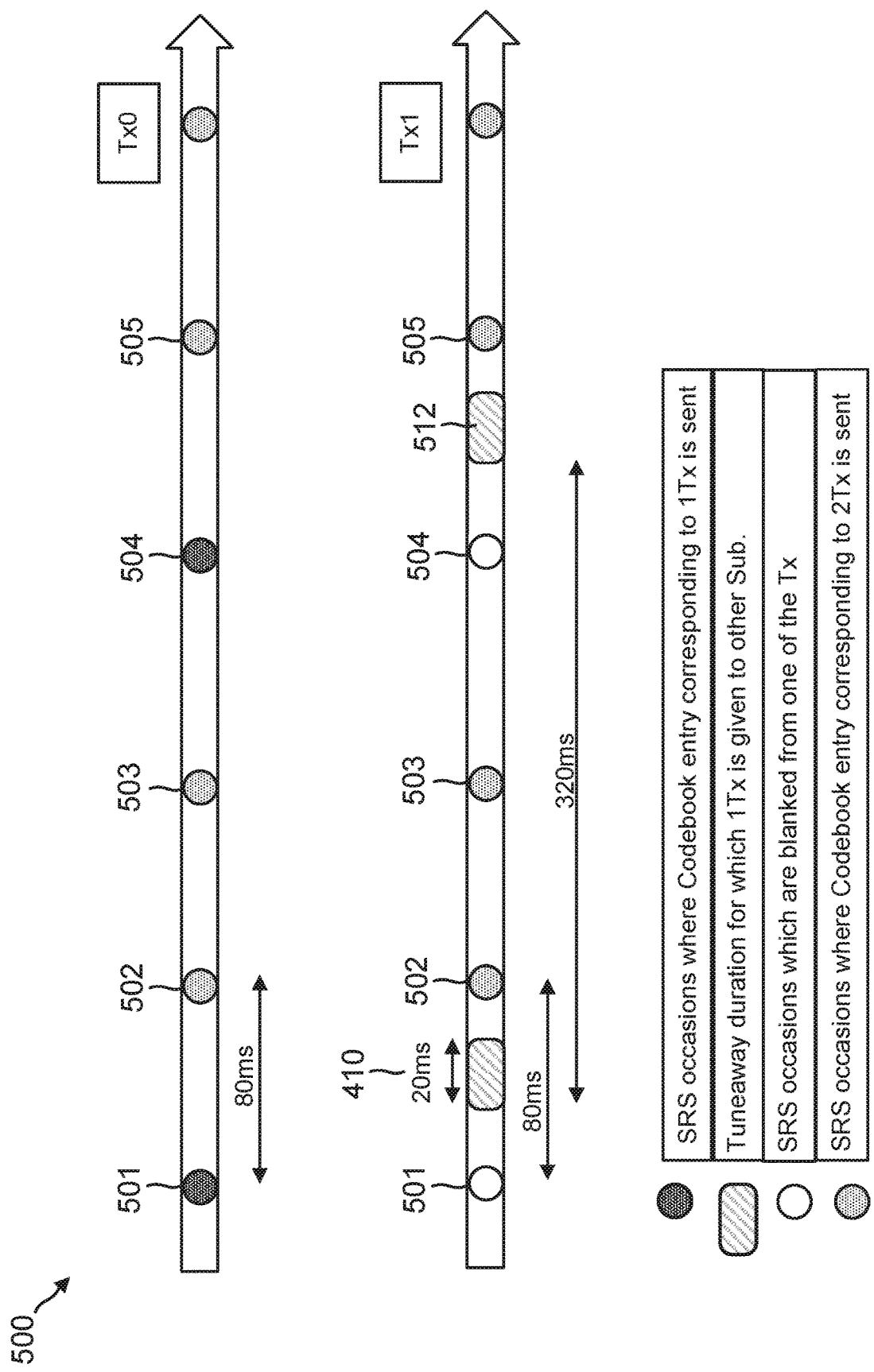

FIG. 5 is an illustration of an example timeline 500, according to one implementation. The timeline 500 may represent the operation of a UE, such as UE 115 (FIG. 1), UE 215 (FIG. 2), or UE 800 (FIG. 8).

The embodiment of FIG. 5 is offered in contrast to the embodiment of FIG. 4. The embodiment of FIG. 5 recognizes the loss of throughput associated with the penalization durations and provides a mitigation technique to improve throughput versus the embodiment of FIG. 4.

The timeline 500 shows operation of an active-mode subscription of the UE as it employs the two UL MIMO layers, Tx0, Tx1. Similar to the timeline 400, SRS occasions 501-505 have an 80 ms periodicity, the tune away durations 510, 512 have a 320 ms duration, and the tune away durations 510, 512 are the same as or similar to the durations 410, 412.

At SRS occasion 501, layer Tx0 transmits a codebook entry corresponding to a single layer, whereas the layer Tx1 does not transmit a codebook entry (i.e., its SRS occasion is blanked). The network responds to the codebook entry by granting UL resources corresponding to a single layer with appropriate MCS and number of RBs. The UE may then distribute the UL resources between the layers Tx0, Tx1 as appropriate. Between SRS occasions 501, 502 tune away duration 510 occurs, but it does not reduce an amount of granted UL resources that are used because the network only granted UL resources corresponding to a single UL MIMO layer. Therefore, the network does not interpret the UE's activities as BLER and does not penalize the UE.

At SRS occasion 502, the UE transmits codebook entries corresponding to two UL MIMO layers, which the network grants, and the UE uses. The same occurs at SRS occasion 503 and 505. Since tune away duration 512 occurs between SRS occasions 504, 505, the UE transmits a codebook entry at SRS occasion 504 corresponding to a single UL MIMO layer and then reverts to transmitting codebook entries at SRS occasion 505 corresponding to two UL MIMO layers. This is similar to the actions at SRS occasions 501 and 502.

As noted above, there is a periodicity associated with the SRS occasions as well as with the tune away durations. The timing of both may be known by the UE, and the UE may then use its knowledge of the timing to implement the technique of FIG. 5. For instance, once the periodicity of the SRS occasions, periodicity of the tune away durations, and timing offset between SRS occasions and tune away durations are known, the UE may then establish appropriate signaling for different quantities of layers.

Looking at timeline 500, a first pattern of SRS occasions includes SRS occasions 501, 504. In other words, one out of every three SRS occasions includes transmitting one or more codebook entries corresponding to a first quantity of UL MIMO layers. A second pattern of SRS occasions includes SRS occasions 502, 503, 505 and on and on. In other words, two out of every three SRS occasions include transmitting one or more codebook entries corresponding to a second quantity of UL MIMO layers. The first pattern of SRS occasions may be positioned in the time domain to precede a tune away duration, such as SRS occasion 501 precedes tune away duration 510. The second pattern may then be positioned in the time domain to be subsequent to the tune away duration, such as SRS occasion 502 being subsequent to tune away duration 510. As patterns, they repeat, as do the tune away durations.

In some implementations, the reduction in granted UL resources attributable to signaling different quantities of layers, as in FIG. 5, is less than the reduction that is attributable to the penalization durations of FIG. 4. Thus, operation according to the techniques of FIG. 5 may increase throughput when compared to operations according to the techniques of FIG. 4.

The timelines 400 and 500 are not drawn to scale, so it is understood that the tune away durations and penalization durations are for illustration only.

Figure 6:
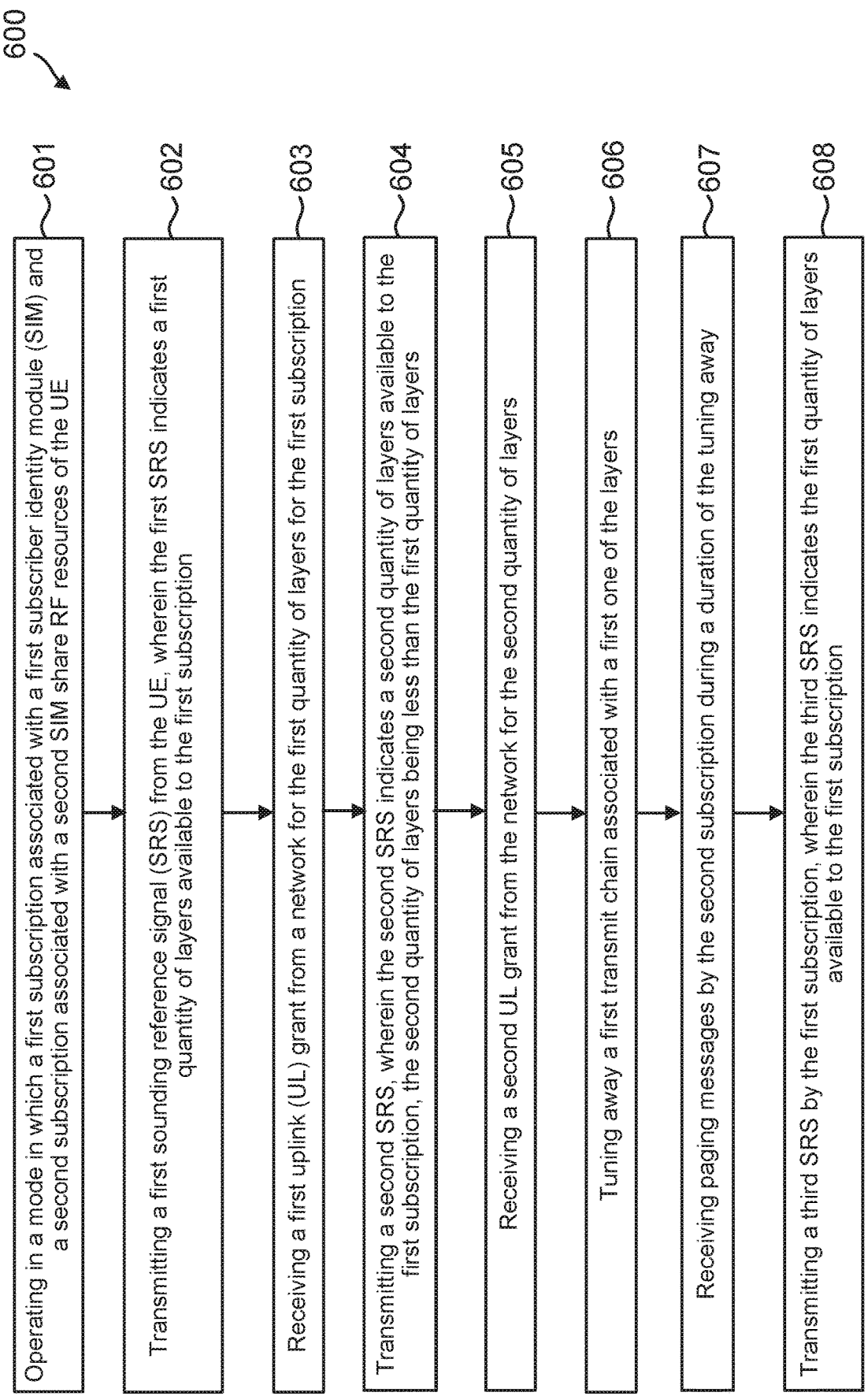
FIGS. 6-7 are diagrams of example methods for signaling a changing number of layers, according to some aspects of the present disclosure.

FIG. 6 is a flowchart of a method 600 to increase throughput in a multi-SIM system, according to some aspects of the present disclosure. The method 600 may be performed by a UE, such as UE 115 (FIG. 1), UE 215 (FIG. 2), or UE 800 (FIG. 8). As illustrated, the method 600 includes a number of enumerated actions, but aspects of the method 600 may include additional actions before, after, and in between the enumerated actions. In some aspects, one or more of the enumerated actions may be omitted or performed in a different order.

At action 601, the UE operates in a mode in which a first subscription associated with a first SIM and a second subscription associated with a second SIM share RF resources of the UE. For instance, depending on the hardware of the UE and the frequency domain resources for transmitting and receiving, the UE may share RF hardware resources between the two subscriptions. An example includes the UE transmitting on multiple MIMO layers for the first subscription, where resources such as a power amplifier (PA) or other hardware may be temporarily given to the second subscription in idle mode to perform reception.

The operating mode may include a DSDS mode in which the first subscription is designated as the DDS, and in which a second SIM is the nDDS. Similarly, the operating mode may include a DSDA mode. Whether in DSDS or DSDA mode, the DDS is in active-mode, whereas the nDDS is in idle mode. The first subscription and the second subscription may be serviced by a same network or different networks.

At action 602, the UE transmits a first SRS. In this example, the first SRS indicates a first quantity of layers available to the first subscription. For instance, the SRS occasion may include transmitting a codebook entry that indicates a first quantity of UL MIMO layers. In the example of FIG. 5, the codebook entry may indicate to UL MIMO layers.

At action 603, the UE receives a first UL grant from the network for the first quantity of layers for the first subscription. In the example of FIG. 5, the network may determine to grant UL resources corresponding to the first quantity of UL MIMO layers along with appropriate MCS and RBs.

At action 604, the UE transmits a second SRS. In this example, the second SRS indicates a second quantity of layers available to the first subscription. In the example of FIG. 5, this may be illustrated by SRS occasion 504, which included transmitting a codebook entry indicating a lesser quantity of available layers (e.g., one). Further in this example, action 604 is performed responsive to an upcoming tune away duration.

At action 605, the UE receives a second UL grant from the network for the second quantity of layers along with an appropriate MCS and RBs. For instance, in the example of FIG. 5, the UE receives a grant of UL resources corresponding to a single UL MIMO layer in response to the codebook entry at SRS occasion 504.

At action 606, the UE tunes away a first transmit chain associated with the first one of the layers. For instance, in the example of FIG. 5, an RF transmit chain associated with the layer Tx1 switches from serving a first frequency band associated with the first subscription to serving a second frequency band associated with the paging operation of the second subscription. At the end of the tune away duration, the RF transmit chain switches back to serving the first frequency band. Example tune away durations include tune away durations 510, 512 of FIG. 5.

At action 607, the UE receives a paging message or paging messages from a network that is associated with the second subscription. The paging messages may be received during a tune away duration, such as the tune away duration 512 illustrated in FIG. 5. Action 607 may also include the UE performing various measurements, such as for reference signal received power (RSRP), received signal strength indicator (RSSI), signal and interference to noise ratio (SINR), and the like. The tune away duration is a time during which shared RF circuitry is unavailable to the first subscription while it is being used by the second subscription for page decode and measurement.

At action 608, the UE transmits a third SRS by the first subscription. The third SRS indicates the first quantity of layers available for the first subscription. In other words, once the tune away duration has passed, the first subscription may indicate the first quantity of layers (e.g., two) is available for UL. Action 608 may also include receiving a UL grant from the network corresponding to the first quantity of layers and having appropriate MCS and RBs. For instance, in the example of FIG. 5, the first subscription indicates two layers at SRS occasions that are not immediately preceding tune away duration (e.g., SRS occasions 502, 503, 505) and indicates one layer at SRS occasions that immediately precede a tune away duration (e.g., SRS occasions 501, 504).

The action 601-607 may be repeated as often as appropriate. For instance, as the UE moves from one base station to another base station, configurations may be changed, including a timing of paging reception and a timing of SRS. Accordingly, the various periodicities may change, and the UE may adjust the quantity of layers in its codebook entries as appropriate. In some examples, the method 600 may further include the UE determining a time associated with a paging cycle of the second subscription, determining to indicate the second quantity of layers available to the first subscription in a SRS occasion that precedes the paging reception by the second subscription, and also determining to indicate the first quantity of layers available to the first subscription in a different SRS occasion that a subsequent the paging reception by the second subscription. Some examples may include the UE indicating the second quantity of layers according to the periodicity of the paging cycle.

Figure 7:
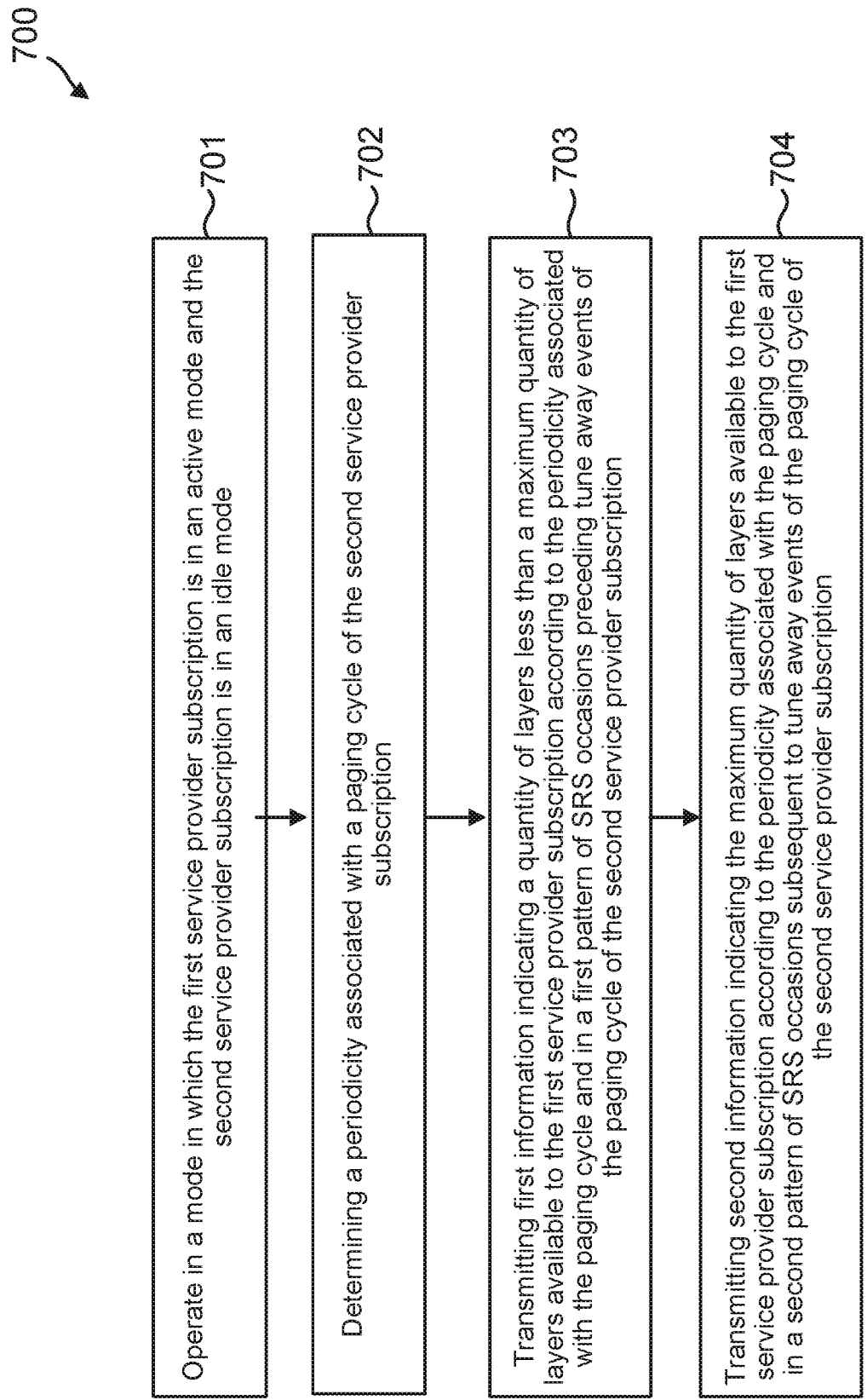

FIG. 7 is a flowchart of a method 700 to increase throughput in a multi-SIM system, according to some aspects of the present disclosure. The method 700 may be performed by UE, such as UE 115 (FIG. 1), UE 215 (FIG. 2), or UE 800 (FIG. 8). As illustrated, the method 700 includes a number of enumerated actions, but aspects of the method 700 may include additional actions before, after, and in between the enumerated actions. In some aspects, one or more of the enumerated actions may be omitted or performed in a different order.

At action 701, the UE operates in a mode in which the first service provider subscription is in an active mode and the second service provider subscription is in an idle mode. For instance, the first service provider subscription may be associated with a first SIM, and the second service provider subscription may be associated with a second SIM. The operating mode may include DSDA or DSDS.

At action 702, the UE determines a periodicity associated with the paging cycle of the second service provider subscription. The paging cycle may be assigned by a network that serves the second service provider subscription, and that may be the same or different than the network that serves the first service providers description. In any event, the paging cycle has a periodicity, and the associated tune away time may have a duration. In the example of FIG. 5, the paging cycle has a periodicity of 320 ms, and the tune away duration is 20 ms, though the scope of implementations is not limited to any particular periodicity or duration.

At action actions 703 and 704, the UE transmits information according to different patterns to indicate a changing number of available MIMO UL layers.

For instance, at action 703, the UE transmits first information indicating a quantity of layers less than a maximum quantity of layers available to the first service provider subscription. This is performed according to the periodicity associated with the paging cycle and in a first pattern of SRS occasions that precede tune away events of the paging cycle. In the example of FIG. 5, SRS occasions 501 and 504 are in a first pattern, and they precede the tune away durations 510, 512. Further in the example of FIG. 5, the information includes at least one codebook entry that corresponds to a single UL layer.

At action 704, the UE transmits second information indicating the maximum quantity of layers available to the first service provider subscription. This is performed according to the periodicity associated with the paging cycle and in a second pattern of SRS occasions. In the example of FIG. 5, the second pattern of SRS occasions includes SRS occasions 502, 503, 505, which are subsequent the tune away durations 510, 512 that are associated with the paging cycle of the second subscription. Further in the example of FIG. 5, the second information includes at least one codebook entry that corresponds to two UL layers.

Collectively, the two patterns account for all of the SRS occasions in the example of FIG. 5, so that an SRS occasion of the first pattern and an SRS occasion of the second pattern surround a tune away duration.

In the example of FIG. 5, the length of the tune away duration is smaller than a time period between adjacent SRS occasions. For instance, in FIG. 5, the tune away durations are 20 ms, whereas the SRS occasions are 80 ms apart. However, the scope of implementations is adaptable to any arrangement of durations and periods. In an example in which a tune away duration is larger than the period between SRS occasions, then a given tune away duration may span at least one SRS occasion. In such instances, action 703 may include sending the first information on more than one consecutive SRS occasion to accommodate the length of the tune away duration.

FIG. 8 is a block diagram of an exemplary UE 800 according to some aspects of the present disclosure. The UE 800 may be a UE 115 or UE 215 as discussed above in FIGS. 1-2 and may conform to the hardware architecture described above with respect to FIG. 3. As shown, the UE 800 may include a processor 802, a memory 804, a Multi-SIM module 808, a transceiver 810 including a modem subsystem 812 and a radio frequency (RF) unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to a UE 115, 215 in connection with aspects of the present disclosure, for example, aspects of FIGS. 1-7. Instructions 806 may also be referred to as code, which may include any type of computer-readable statements.

The Multi-SIM module 808 may be implemented via hardware, software, or combinations thereof. For example, the Multi-SIM module 808 may be implemented as a processor, circuit, and/or instructions 806 stored in the memory 804 and executed by the processor 802.

In some aspects, the Multi-SIM module 808 may include multiple SIMs or SIM cards (e.g., 2, 3, 4, or more) similar to the SIMs 210. Each SIM may be configured to store information used for accessing a network, for example, to authenticate and identify the UE 800 as a subscriber of the network. Some examples of information stored on a SIM may include, but not limited to, a subscriber identity such as an international mobile subscriber identity (IMSI) and/or information and/or key used to identify and authenticate the UE 800 in a certain provider network. In some aspects, the UE 800 may have a first service provider subscription on a first SIM of the multiple SIMs and a second service provider subscription on a second SIM of the multiple SIMs. The first subscription may identify the UE 800 by a first subscriber identity, and the second subscription may identify the UE 800 by a second subscriber identity.

In some embodiments, the functionality described above with respect to FIGS. 6-7 may be included as logic within Multi-SIM module 808. Other embodiments, the functionality may be included in another component, such as in computer readable code within instructions 806 in memory 804.

As shown, the transceiver 810 may include the modem subsystem 812 and the RF unit 814. The transceiver 810 can be configured to communicate bi-directionally with other devices, such as the BSs 105 and 900. The modem subsystem 812 may be configured to modulate and/or encode the data from the memory 804 and the Multi-SIM module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 105, or an anchor. The RF unit 814 may be further configured to perform analog beamforming in conjunction with digital beamforming. Although shown as integrated together in transceiver 810, the modem subsystem 812 and the RF unit 814 may be separate devices that are coupled together at the UE 800 to enable the UE 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., RRC configurations, MIB, PDSCH data and/or PDCCH DCIs, etc.) to the Multi-SIM module 808 for processing. The antennas 816 may include multiple antennas of similar or different designs in order to sustain multiple transmission links.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
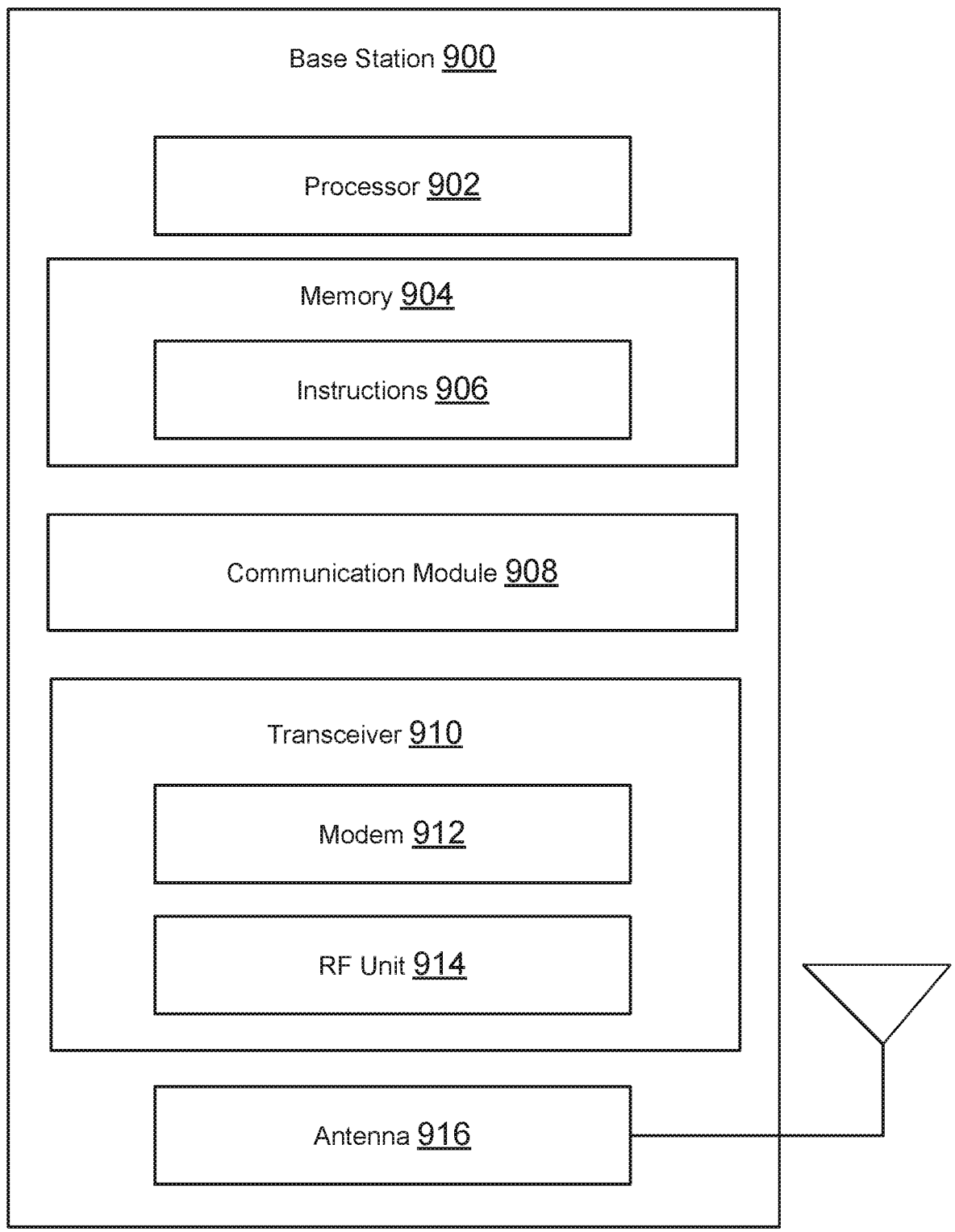
FIG. 9 illustrates a block diagram of a base station (BS) according to some aspects of the present disclosure.

FIG. 9 is a block diagram of an exemplary BS 900 according to some aspects of the present disclosure. The BS 900 may be a BS 105 or a BS 205 as discussed in FIGS. 1 and 2. As shown, the BS 900 may include a processor 902, a memory 904, a communication module 908, a transceiver 910 including a modem subsystem 912 and a RF unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 1 and 2. Instructions 906 may also be referred to as program code. The program code may be for causing a wireless communication device to perform these operations, for example by causing one or more processors (such as processor 902) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 908 may be implemented via hardware, software, or combinations thereof. For example, the communication module 908 may be implemented as a processor, circuit, and/or instructions 906 stored in the memory 904 and executed by the processor 902. In some examples, the communication module 908 can be integrated within the modem subsystem 912. For example, the communication module 908 can be implemented by a combination of software components (e.g., executed by a DSP or a general processor) and hardware components (e.g., logic gates and circuitry) within the modem subsystem 912. The communication module 908 may communicate with one or more components of BS 900 to implement various aspects of the present disclosure, for example, aspects of FIGS. 1 and 2.

As shown, the transceiver 910 may include the modem subsystem 912 and the RF unit 914. The transceiver 910 can be configured to communicate bi-directionally with other devices, such as the UEs 115, 215 and/or UE 800 and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., RRC configurations, MIB, PDSCH data and/or PDCCH DCIs, etc.) from the modem subsystem 912 (on outbound transmissions) or of transmissions originating from another source such as a UE 115, 215, and/or UE 800. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 900 to enable the BS 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices and provide the received data messages for processing and/or demodulation at the transceiver 910. The transceiver 910 may provide the demodulated and decoded data (e.g., PUSCH data, PUCCH UCI, MSG1, MSG3, etc.) to the communication module 908 for processing. The antennas 916 may include multiple antennas of similar or different designs in order to sustain multiple transmission links.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

Further aspects of the present disclosure include the following clauses:

1. A method of wireless communication performed by a user equipment (UE), the method comprising:
   operating in a mode in which a first subscription associated with a first subscriber identity module (SIM) and a second subscription associated with a second SIM share radio frequency (RF) resources of the UE;
   transmitting a first sounding reference signal (SRS) from the UE, wherein the first SRS indicates a first quantity of layers available to the first subscription;
   receiving a first uplink (UL) grant from a network for the first quantity of layers for the first subscription;
   transmitting a second SRS, wherein the second SRS indicates a second quantity of layers available to the first subscription, the second quantity of layers being less than the first quantity of layers;
   receiving a second UL grant from the network for the second quantity of layers;
   tuning away a first transmit chain associated with a first one of the layers;
   receiving paging messages by the second subscription during a duration of the tuning away; and
   subsequent to the duration of the tuning away, transmitting a third SRS by the first subscription, wherein the third SRS indicates the first quantity of layers available to the first subscription.

2. The method of clause 1, wherein the first subscription is designated as a default data subscription (DDS).

3. The method of any of clauses 1-2, wherein the first quantity of layers corresponds to a maximum quantity of layers available to the first subscription.

4. The method of any of clauses 1-3, further comprising:
   determining a time associated with a paging cycle of the second subscription;
   determining to indicate the second quantity of layers available to the first subscription in a first SRS occasion preceding a paging reception by the second subscription; and
   determining to indicate the first quantity of layers available to the first subscription in a second SRS occasion subsequent to the paging reception by the second subscription.

5. The method of clause 4, further comprising:
   indicating the second quantity of layers available to the first subscription according to a periodicity associated with the paging cycle.

6. The method of clause 4, wherein the first SRS occasion immediately precedes the paging reception by the second subscription.

7. The method of clause 4, wherein the duration of the tuning away is longer than a time between subsequent SRS occasions, the method further comprising:
   determining to indicate the second quantity of layers available to the first subscription in an additional SRS occasion during the paging reception by the second subscription.

8. The method of any of clauses 1-7, wherein the mode comprises a Dual SIM Dual Standby (DSDS) mode.

9. The method of any of clauses 1-7, wherein the mode comprises a Dual SIM Dual Active (DSDA) mode.

10. The method of any of clauses 1-9, wherein the first quantity of layers comprises: a plurality (N) of data streams in separate beams using a same time resource and a same frequency resource in each of the beams, wherein N is an integer larger than one.

11. The method of any of clauses 1-10, wherein the duration of the tuning away includes at least some of the RF resources switching from serving a first frequency band associated with the first subscription to serving a second frequency band associated with the second subscription and switching back to serving the first frequency band.

12. A user equipment (UE) comprising:
a first subscriber identity module (SIM) associated with a first service provider subscription and a second SIM associated with a second service provider subscription; and
a processor configured to access the first SIM and the second SIM, wherein the processor is further configured to:
operate in a mode in which the first service provider subscription is in an active mode and the second service provider subscription is in an idle mode;
determine a periodicity associated with a paging cycle of the second service provider subscription;
transmit first information indicating a quantity of layers less than a maximum quantity of layers available to the first service provider subscription according to the periodicity associated with the paging cycle and in a first pattern of SRS occasions preceding tune away events of the paging cycle of the second service provider subscription; and
transmit second information indicating the maximum quantity of layers available to the first service provider subscription according to the periodicity associated with the paging cycle and in a second pattern of SRS occasions subsequent to tune away events of the paging cycle of the second service provider subscription.

13. The UE of clause 12, wherein the mode comprises a Dual SIM Dual Standby (DSDS) mode.

14. The UE of clause 12, wherein the mode comprises a Dual SIM Dual Active (DSDA) mode.

15. The UE of any of clauses 12-14, wherein the maximum quantity of layers comprises: a plurality (N) of data streams in separate beams using a same time resource and a same frequency resource in each of the beams, wherein N is an integer larger than one.

16. The UE of any of clauses 12-15, wherein a duration of the tune away events includes at least some RF resources of the UE switching from serving a first frequency band associated with the first service provider subscription to serving a second frequency band associated with the second service provider subscription and switching back to serving the first frequency band.

17. The UE of clause 16, wherein the duration of the tune away events is longer than a time between subsequent SRS occasions, the processor further configured to:
indicate the quantity of layers less than a maximum quantity of layers available to the first service provider subscription in two or more consecutive SRS occasions.

18. A non-transitory computer-readable medium having program code recorded thereon for wireless communication by a user equipment (UE), the program code comprising:
code for operating in a mode in which a first subscription associated with a first subscriber identity module (SIM) and a second subscription associated with a second SIM share radio frequency (RF) resources of the UE;
code for transmitting an indication of a first quantity of layers available to the first subscription during a first sounding reference signal (SRS) occasion;
code for receiving a first uplink (UL) grant from a network for the first quantity of layers for the first subscription;
code for transmitting an indication of a second quantity of layers available to the first subscription during a second SRS occasion, the second quantity of layers being less than the first quantity of layers;
code for receiving a second UL grant from the network for the second quantity of layers;
code for tuning away a first transmit chain associated with a first one of the layers;
code for receiving paging messages by the second subscription during a duration of the tuning away; and
code for transmitting an indication of the first quantity of layers during a third SRS occasion subsequent to the duration of the tuning away.

19. The non-transitory computer-readable medium of clause 18, further comprising:
code for determining a time associated with a paging cycle of the second subscription;
code for indicating the second quantity of layers preceding a paging reception by the second subscription; and
code for indicating the first quantity of layers subsequent to the paging reception by the second subscription.

20. The non-transitory computer-readable medium of clause 19, further comprising:
code for indicating the second quantity of layers according to a periodicity associated with the paging cycle.

21. The non-transitory computer-readable medium of clause 19, wherein the second SRS occasion immediately precedes the paging reception by the second subscription.

22. The non-transitory computer-readable medium of clause 19, wherein the duration of the tuning away is longer than a time between subsequent SRS occasions, the program code further comprising:
code for indicating the second quantity of layers available to the first subscription in an additional SRS occasion during the paging reception by the second subscription.

23. A user equipment (UE) comprising:
a first subscriber identity module (SIM) associated with a first service provider subscription and a second SIM associated with a second service provider subscription;
means for operating the first service provider subscription in an active-mode and operating the second service provider subscription in an idle mode; and
means for signaling a changing quantity of multiple input, multiple output (MIMO) layers available to the first service provider subscription in response to radio frequency (RF) resource sharing with the second service provider subscription for a paging operation of the second service provider subscription.

24. The UE of clause 23, wherein the means for signaling comprises:
means for transmitting first information indicating a first quantity of MIMO layers less than a maximum quantity of MIMO layers available to the first service provider subscription according to a periodicity associated with a paging cycle of the second service provider subscription and in a first pattern of sounding reference signal (SRS) occasions preceding tune away events of the paging cycle of the second service provider subscription; and
means for transmitting second information indicating the maximum quantity of MIMO layers available to the first service provider subscription according to the periodicity associated with the paging cycle and in a second pattern of SRS occasions subsequent to tune away events of the paging cycle of the second service provider subscription.

25. The UE of clause 24, wherein the maximum quantity of MIMO layers comprises: a plurality (N) of data streams in separate beams using a same time resource and a same frequency resource in each of the beams, wherein N is an integer larger than one.

26. The UE of clause 24, wherein a duration of the tune away events includes at least some RF resources of the UE switching from serving a first frequency band associated with the first service provider subscription to serving a second frequency band associated with the second service provider subscription and switching back to serving the first frequency band.

27. The UE of clause 23, further comprising:
means for determining a periodicity associated with a paging cycle of the second service provider subscription, wherein the changing quantity of MIMO layers changes according to the periodicity and is lower during the paging operation and higher subsequent to the paging operation. The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
operating in a mode in which a first subscription associated with a first subscriber identity module (SIM) and a second subscription associated with a second SIM share radio frequency (RF) resources of the UE;
transmitting a first sounding reference signal (SRS) from the UE, wherein the first SRS indicates a first quantity of layers available to the first subscription;
receiving a first uplink (UL) grant from a network for the first quantity of layers for the first subscription;
transmitting a second SRS, wherein the second SRS indicates a second quantity of layers available to the first subscription, the second quantity of layers being less than the first quantity of layers;
receiving a second UL grant from the network for the second quantity of layers;
tuning away a first transmit chain associated with a first one of the layers;
receiving paging messages by the second subscription during a duration of the tuning away; and
subsequent to the duration of the tuning away, transmitting a third SRS by the first subscription, wherein the third SRS indicates the first quantity of layers available to the first subscription.

2. The method of claim 1, wherein the first subscription is designated as a default data subscription (DDS).

3. The method of claim 1, wherein the first quantity of layers corresponds to a maximum quantity of layers available to the first subscription.

4. The method of claim 1, further comprising:
determining a time associated with a paging cycle of the second subscription;
determining to indicate the second quantity of layers available to the first subscription in a first SRS occasion preceding a paging reception by the second subscription; and
determining to indicate the first quantity of layers available to the first subscription in a second SRS occasion subsequent to the paging reception by the second subscription.

5. The method of claim 4, further comprising:
indicating the second quantity of layers available to the first subscription according to a periodicity associated with the paging cycle.

6. The method of claim 4, wherein the first SRS occasion immediately precedes the paging reception by the second subscription.

7. The method of claim 4, wherein the duration of the tuning away is longer than a time between subsequent SRS occasions, the method further comprising:
determining to indicate the second quantity of layers available to the first subscription in an additional SRS occasion during the paging reception by the second subscription.

8. The method of claim 1, wherein the mode comprises a Dual SIM Dual Standby (DSDS) mode.

9. The method of claim 1, wherein the mode comprises a Dual SIM Dual Active (DSDA) mode.

10. The method of claim 1, wherein the first quantity of layers comprises: a plurality (N) of data streams in separate beams using a same time resource and a same frequency resource in each of the beams, wherein N is an integer larger than one.

11. The method of claim 1, wherein the duration of the tuning away includes at least some of the RF resources switching from serving a first frequency band associated with the first subscription to serving a second frequency band associated with the second subscription and switching back to serving the first frequency band.

12. A non-transitory computer-readable medium having program code recorded thereon for wireless communication by a user equipment (UE), the program code comprising:
 code for operating in a mode in which a first subscription associated with a first subscriber identity module (SIM) and a second subscription associated with a second SIM share radio frequency (RF) resources of the UE;
 code for transmitting an indication of a first quantity of layers available to the first subscription during a first sounding reference signal (SRS) occasion;
 code for receiving a first uplink (UL) grant from a network for the first quantity of layers for the first subscription;
 code for transmitting an indication of a second quantity of layers available to the first subscription during a second SRS occasion, the second quantity of layers being less than the first quantity of layers;
 code for receiving a second UL grant from the network for the second quantity of layers;
 code for tuning away a first transmit chain associated with a first one of the layers;
 code for receiving paging messages by the second subscription during a duration of the tuning away; and
 code for transmitting an indication of the first quantity of layers during a third SRS occasion subsequent to the duration of the tuning away.

13. The non-transitory computer-readable medium of claim 12, further comprising:
 code for determining a time associated with a paging cycle of the second subscription;
 code for indicating the second quantity of layers preceding a paging reception by the second subscription; and
 code for indicating the first quantity of layers subsequent to the paging reception by the second subscription.

14. The non-transitory computer-readable medium of claim 13, further comprising:
 code for indicating the second quantity of layers according to a periodicity associated with the paging cycle.

15. The non-transitory computer-readable medium of claim 13, wherein the second SRS occasion immediately precedes the paging reception by the second subscription.

16. The non-transitory computer-readable medium of claim 13, wherein the duration of the tuning away is longer than a time between subsequent SRS occasions, the program code further comprising:
 code for indicating the second quantity of layers available to the first subscription in an additional SRS occasion during the paging reception by the second subscription.

\* \* \* \* \*